(12) United States Patent
Tu

(10) Patent No.: US 11,029,274 B2
(45) Date of Patent: Jun. 8, 2021

(54) HUMIDITY SENSOR AND MANUFACTURING METHOD THEREOF

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Yu-Chieh Tu, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 97 days.

(21) Appl. No.: 16/691,628

(22) Filed: Nov. 22, 2019

(65) Prior Publication Data

US 2021/0063338 A1 Mar. 4, 2021

(30) Foreign Application Priority Data

Aug. 29, 2019 (CN) .......................... 201910807063.0

(51) Int. Cl.
*G01N 27/22* (2006.01)

(52) U.S. Cl.
CPC .......... *G01N 27/226* (2013.01); *G01N 27/223* (2013.01)

(58) Field of Classification Search
CPC ... G01N 27/223; G01N 27/121; G01N 27/125
See application file for complete search history.

(56) References Cited

U.S. PATENT DOCUMENTS

| 4,462,930 A  * | 7/1984 | Suzuki ................ G01N 27/121 252/519.1 |
| 4,751,022 A  * | 6/1988 | Sugio .................. G01N 27/121 252/519.4 |
| 7,013,708 B1 * | 3/2006 | Cho ....................... B82Y 30/00 257/414 |
| 2010/0043529 A1* | 2/2010 | Wang .................. G01N 27/125 73/29.02 |

* cited by examiner

*Primary Examiner* — Alvaro E Fortich
(74) *Attorney, Agent, or Firm* — CKC & Partners Co., LLC

(57) ABSTRACT

The invention provides a humidity sensor and a manufacturing method thereof. The humidity sensor comprises a substrate, an electrode structure, and a humidity sensing structure. The electrode structure is disposed on the substrate. The humidity sensing structure is disposed on the electrode structure. The humidity sensing structure includes a first humidity sensing layer and a second humidity sensing layer. The first humidity sensing layer is in direct contact with the electrode structure and has a first oxygen vacancy number. The second humidity sensing layer is disposed on the first humidity sensing layer and has a second oxygen vacancy number. The second oxygen vacancy number is greater than the first oxygen vacancy number.

10 Claims, 7 Drawing Sheets

HUMIDITY SENSOR AND MANUFACTURING METHOD THEREOF

CROSS-REFERENCE TO RELATED APPLICATION

This application claims priority to China Application Serial Number 201910807063.0, filed Aug. 29, 2019, which is herein incorporated by reference.

BACKGROUND

Field of Invention

The present disclosure relates to a humidity sensor and a manufacturing method thereof.

Description of Related Art

During a lamination or dispensing process in the manufacturing of mobile communication devices, the ambient humidity in the workshop may have a considerable influence on the product yield. Accordingly, if the ambient humidity of the workshop can be monitored at any time during the process, operators can readily adjust the ambient humidity to ensure a smooth process. However, a conventional humidity sensor can only measure an impedance value of 2 to 3 orders of magnitude, which is not sufficient to meet the aforementioned requirements. Therefore, a sensitivity sensor with a high sensitivity is needed.

SUMMARY

One aspect of the present disclosure provides a humidity sensor. The humidity sensor comprises a substrate, an electrode structure, and a humidity sensing structure. The electrode structure is disposed on the substrate. The humidity sensing structure is disposed on the electrode structure and comprises a first humidity sensing layer and a second humidity sensing layer. The first humidity sensing layer is in direct contact with the electrode structure and has a first oxygen vacancy number. The second humidity sensing layer is disposed on the first humidity sensing layer and has a second oxygen vacancy number greater than the first oxygen vacancy number.

In one or more embodiment, the humidity sensing structure further comprises a third humidity sensing layer disposed on the second humidity sensing layer and having a third oxygen vacancy number greater than the second oxygen vacancy number.

In one or more embodiment, the first humidity sensing layer and the second humidity sensing layer each comprises a perovskite-type oxide material with an $ABO_3$ structure.

In one or more embodiment, the electrode structure comprises an interdigital structure.

Another aspect of the present disclosure provides a method of manufacturing a humidity sensor. The method comprises steps of providing a substrate and an electrode structure, in which the electrode structure is located on the substrate; and forming a humidity sensing structure on the electrode structure. The formation of the humidity sensing structure on the electrode structure comprises forming a first humidity sensing layer at a first sintering temperature, in which the first humidity sensing layer is in direct contact with the electrode structure and has a first oxygen vacancy number; and forming a second humidity sensing layer on the first humidity sensing layer at a second sintering temperature, in which the second sintering temperature is lower than the first sintering temperature, such that a second oxygen vacancy number of the second humidity sensing layer is greater than the first oxygen vacancy number.

In one or more embodiment, the method further comprises steps of forming a third humidity sensing layer on the second humidity sensing layer at a third sintering temperature, in which the third sintering temperature is lower than the second sintering temperature, such that a third oxygen vacancy number of the third humidity sensing layer is greater than the second oxygen vacancy number.

In one or more embodiment, the first humidity sensing layer and the second humidity sensing layer each comprises a perovskite-type oxide material with an $ABO_3$ structure.

In one or more embodiment, the first sintering temperature ranges from 300° C. to 700° C.

In one or more embodiment, the second sintering temperature ranges from 200° C. to 600° C.

In one or more embodiment, the third sintering temperature ranges from 100° C. to 500° C.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
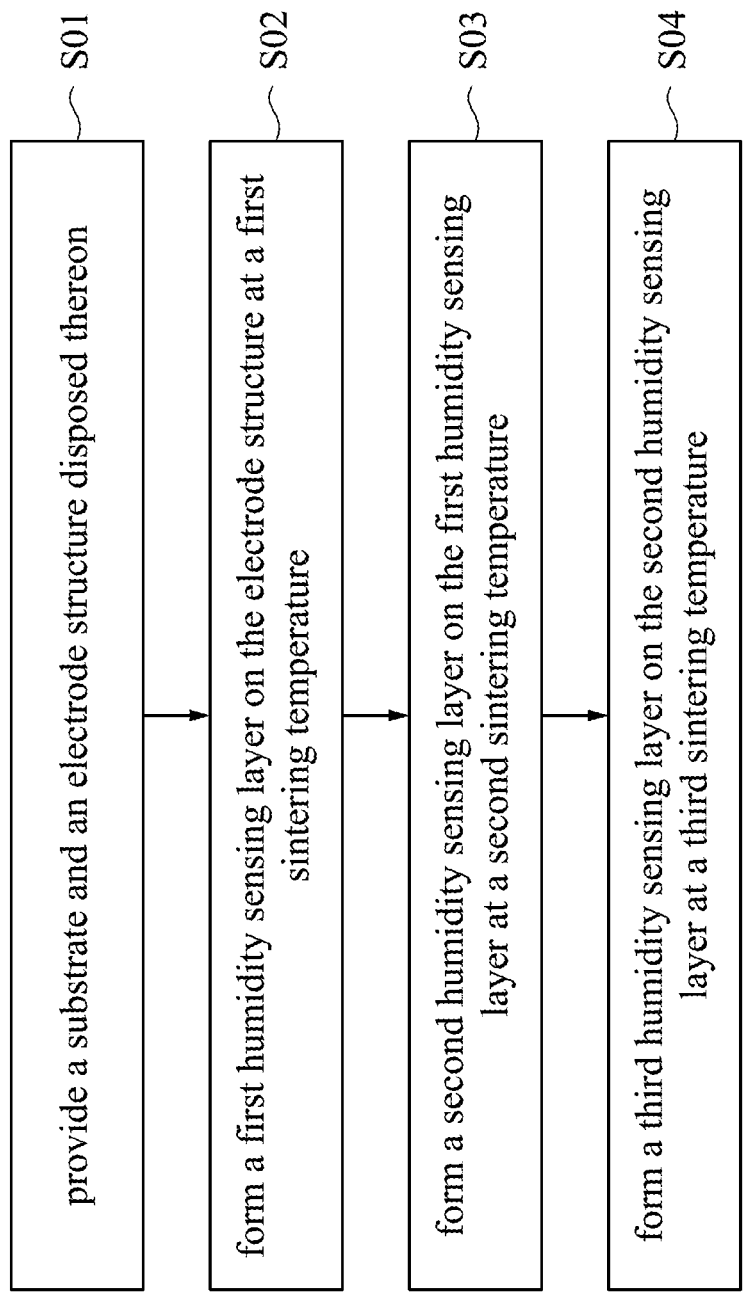
FIG. 1 is a flow chart of a method of manufacturing a humidity sensor according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

One aspect of the present disclosure provides a method of manufacturing a humidity sensor. FIG. 1 is a flow chart of method 10 of manufacturing a humidity sensor according to one embodiment of the present disclosure. FIG. 2 to FIG. 5 are schematic top views of various stages of the method 10 of manufacturing the humidity sensor according to one embodiment of the present disclosure. As shown in FIG. 1, the method 10 comprises step S01 to step S04.

Figure 2:
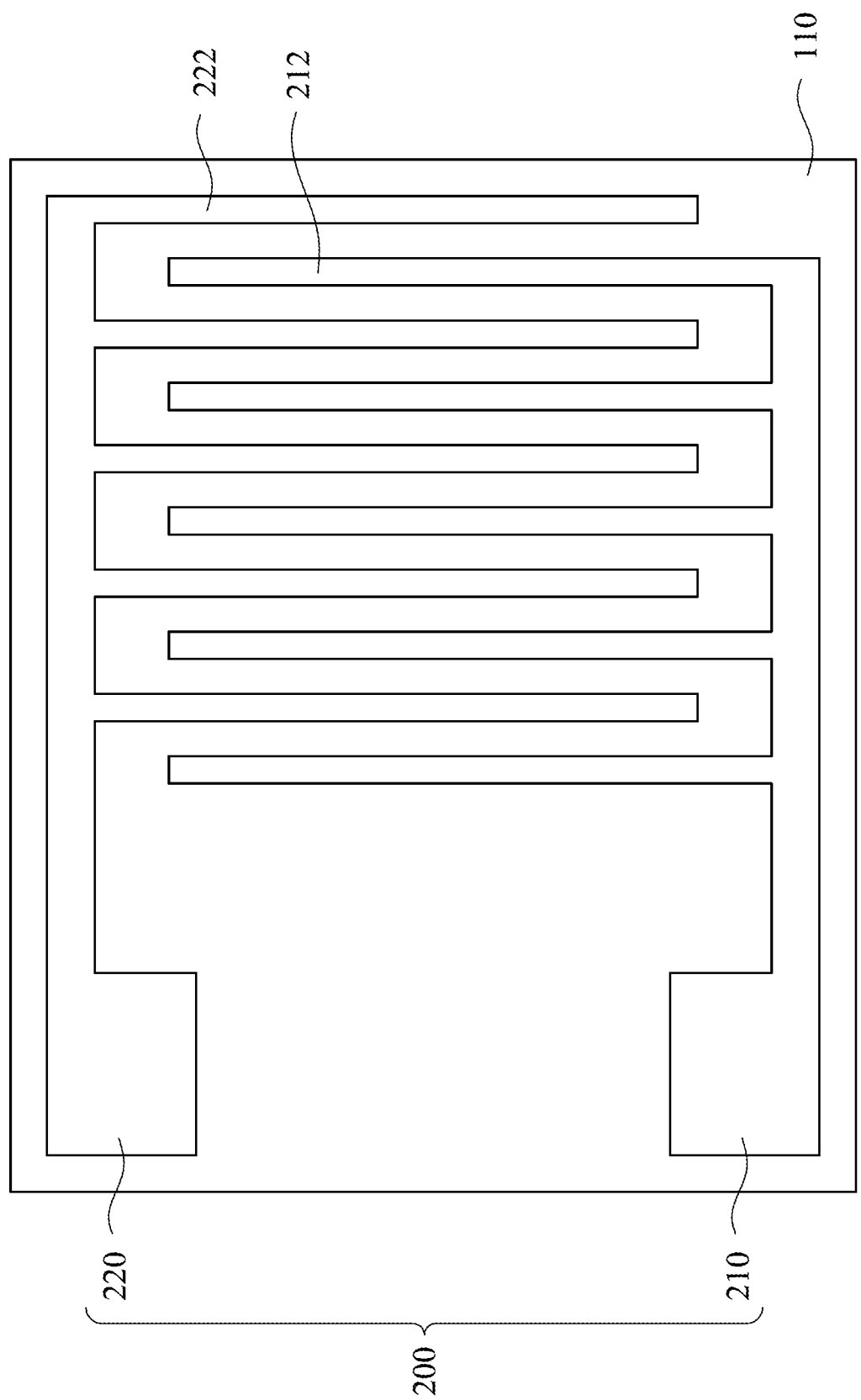
FIG. 2 to FIG. 5 are schematic top views of various stages of the method of manufacturing the humidity sensor according to one embodiment of the present disclosure.

At step S01, a substrate 110 and an electrode structure 200 are provided, as shown in FIG. 2. Specifically, the electrode structure 200 is located on the substrate 110. In one embodiment, the electrode structure 200 includes a first electrode layer 210 and a second electrode layer 220. In one embodiment, the first electrode layer 210 has a first interdigital structure 212, and the second electrode layer 220 has a second interdigital structure 222. The substrate 110 includes an $Al_2O_3$ ceramic substrate. The first electrode layer 210 and the second electrode layer 220 may include Ag—Pd electrode.

Figure 3:
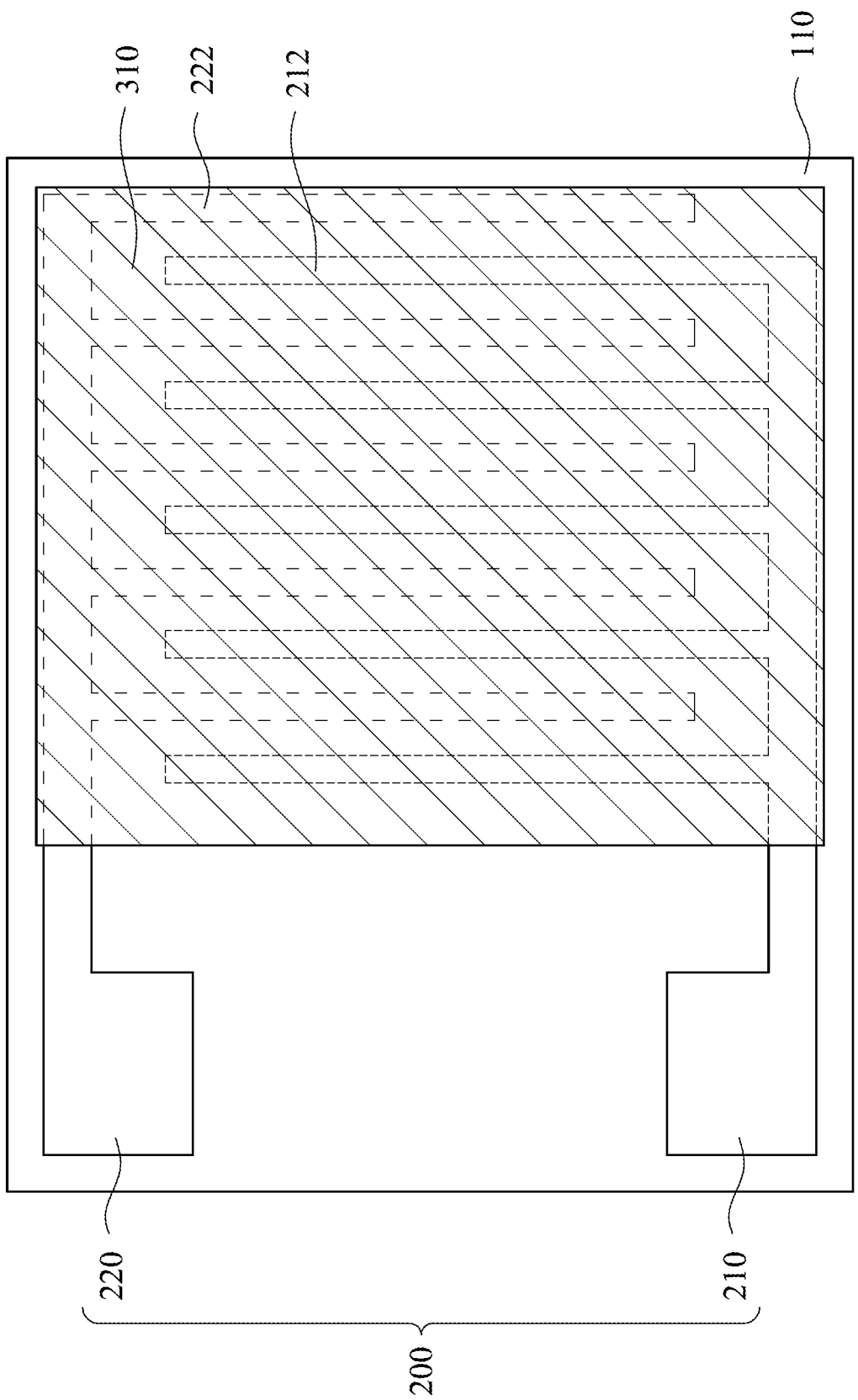

Next, step S02 is performed to form a first humidity sensing layer on the electrode structure at a first sintering temperature. Referring to FIG. 3, a first humidity sensing layer 310 is formed on the electrode structure 200 at a first sintering temperature, in which the first humidity sensing layer 310 has a first oxygen vacancy number. In various embodiments, the first humidity sensing layer 310 is in direct contact with the electrode structure 200. In one embodiment, the first interdigital structure 212 and the second interdigital structure 222 are entirely covered by the first humidity sensing layer 310.

In various embodiments, the first sintering temperature ranges from 300° C. to 700° C., such as 400° C., 500° C., 600° C., 650° C., or 680° C. In various embodiments, the first humidity sensing layer 310 comprises a perovskite-type oxide material with an $ABO_3$ structure, such as bismuth ferrite ($BiFeO_3$), lead zirconate titanate ($Pb(ZrTi)O_3$, PZT), barium titanate ($BaTiO_3$), lead titanate ($PbTiO_3$), and the like, but is not limited thereto. In one embodiment where the first humidity sensing layer 310 is bismuth ferrite, the process of forming the first humidity sensing layer 310 includes but not limited to adding bismuth nitrate and iron nitrate to a mixed solution containing 2-ethoxyethanol and acetic acid and reacting bismuth nitrate and iron nitrate at 70° C. for 30 minutes, followed by drying overnight at 90° C. to form a paste. The paste is applied to the electrode structure 200 and the substrate 110 by spin-coating or other suitable processes. Subsequently, the paste is sintered at the first sintering temperature (i.e., 300° C. to 700° C.) to form the first humidity sensing layer 310. In one example, since bismuth is volatile under high temperature, a molar ratio of bismuth nitrate to iron nitrate ranges from 1.01:1 to 1.09:1, such as 1.03:1, 1.05:1, or 1.07:1 to compensate the volatility of bismuth during the sintering process.

Figure 4:
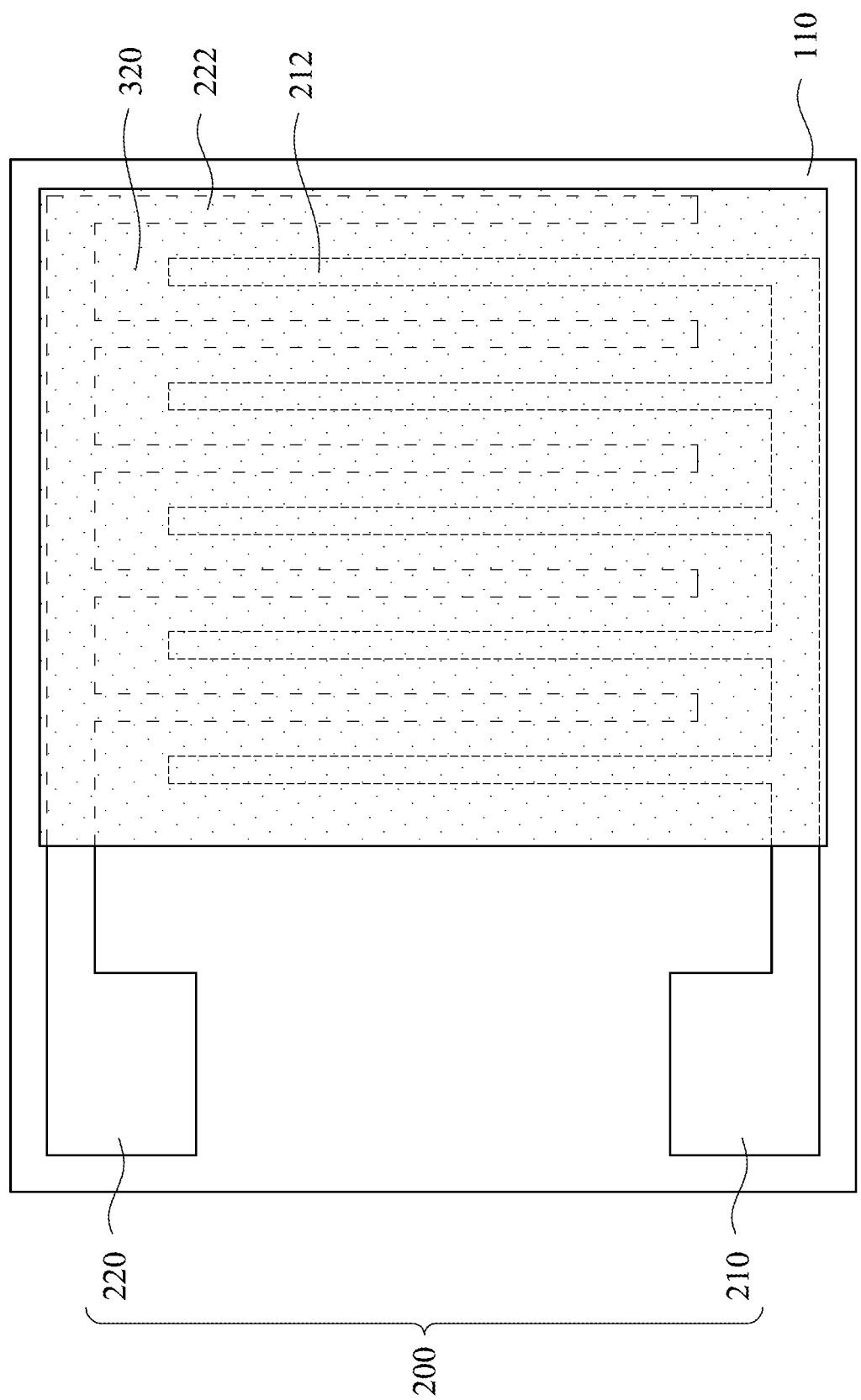

Next, step S03 is performed to form a second humidity sensing layer on the first humidity sensing layer at a second sintering temperature. Referring to FIG. 4, a second humidity sensing layer 320 is formed on the first humidity sensing layer 310 at a second sintering temperature, in which the second humidity sensing layer 320 has a second oxygen vacancy number. It is noted that the second sintering temperature is lower than the first sintering temperature, such that the second oxygen vacancy number of the second humidity sensing layer 320 is greater than the first oxygen vacancy number of the first humidity sensing layer 310. The oxygen vacancy number of bismuth ferrite varies under different sintering temperatures. The oxygen vacancy number of bismuth ferrite decreases along with an elevating sintering temperature. Conversely, The oxygen vacancy number of bismuth ferrite increases along with a decreasing sintering temperature.

In various embodiments, the second sintering temperature ranges from 200° C. to 600° C., such as 250° C., 300° C., 350° C., 400° C., or 500° C. It is understood that the second sintering temperature should be selected to be lower than the first sintering temperature. The arrangement of the difference in the first and second sintering temperatures may provide a specific technical effect, which will be described in detail below.

In some embodiments, the first humidity sensing layer 310 is entirely covered by the second humidity sensing layer 320 over the first interdigital structure 212 and the second interdigital structure 222. The material and the forming process of the second humidity sensing layer 320 are similar to those of the first humidity sensing layer 310 and are not repeated herein.

It is understood that the method disclosed in the present disclosure includes forming at least two humidity sensing layers over the electrode structure. The at least two humidity sensing layers are respectively formed at different sintering temperatures, in which the humidity sensing layer closer to the electrode structure is formed at a higher sintering temperature, and the humidity sensing layer farther away from the electrode structure is formed at a lower sintering temperature.

It is noted that the method disclosed in the present disclosure may also include forming a plurality of humidity sensing layers over electrode structure, in which the plurality of humidity sensing layers are respectively formed at different sintering temperatures. The humidity sensing layer that is closest to the electrode structure is formed at the highest sintering temperature, and other humidity sensing layers sequentially disposed over the electrode structure are respectively formed at diminishing sintering temperatures. One of ordinary skill in the art can select the desired number of the humidity sensing layer based on actual needs. In one or more embodiment of the present disclosure, the sintering temperature ranges from 100° C. to 700° C., and one of ordinary skill in the art can select the suitable sintering temperature for each humidity sensing layer based on the desired number of the humidity sensing layer.

Figure 5:
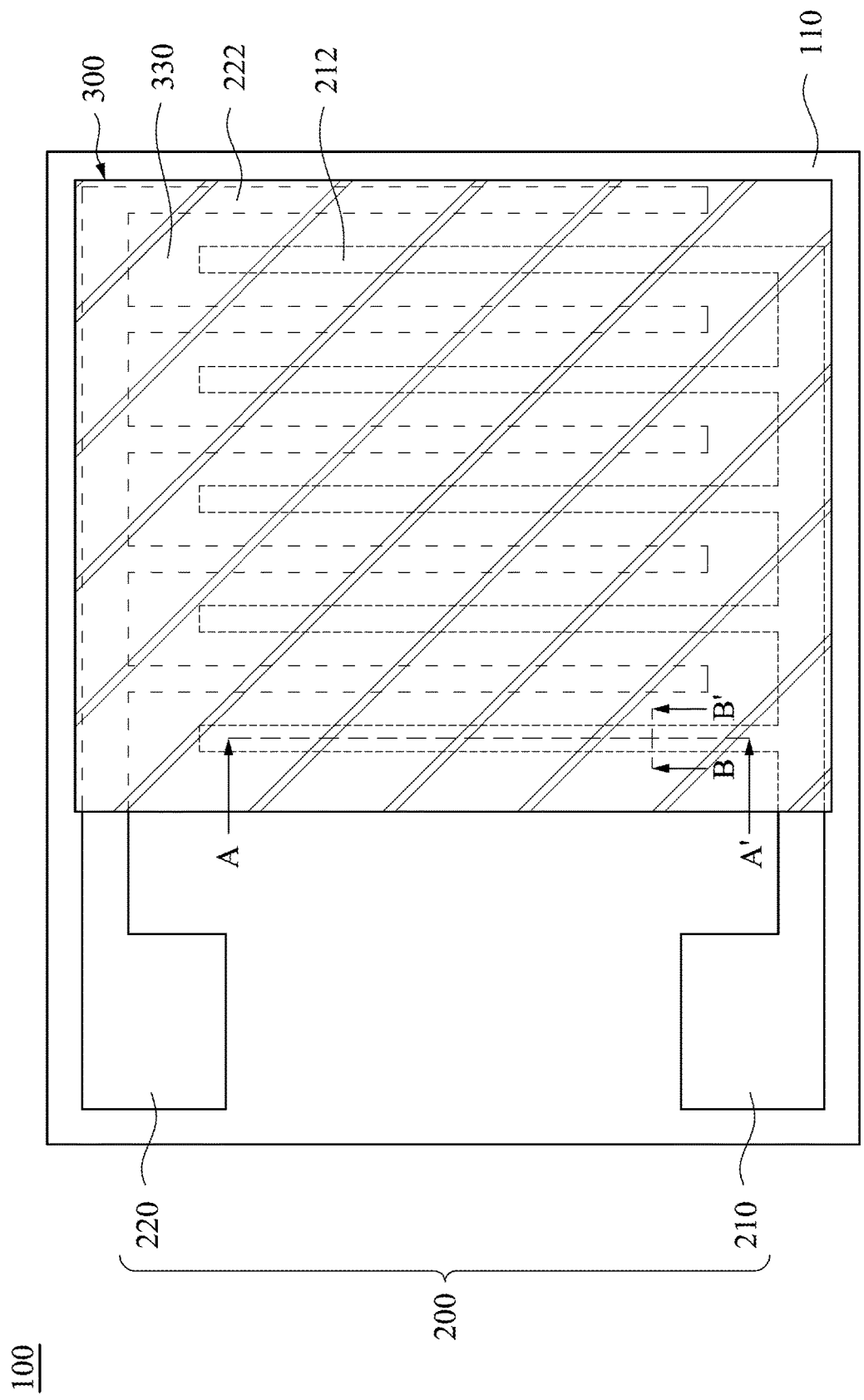

For example, method 10 may further include performing step S04, where a third humidity sensing layer is formed on the second humidity sensing layer at a third sintering temperature. Referring to FIG. 5, a third humidity sensing layer 330 having a third oxygen vacancy number is formed on the second humidity sensing layer 320 at a third sintering temperature. It is noted that the third sintering temperature is lower than the second sintering temperature, such that the third oxygen vacancy number of the third humidity sensing layer 330 is greater than the second oxygen vacancy number. In various embodiments, the third sintering temperature ranges from 100° C. to 500° C., such as 150° C., 180° C., 200° C., 300° C., or 400° C. It is understood that the third sintering temperature should be selected to be lower than the first sintering temperature and the second sintering temperature. The arrangement of the difference in sintering temperatures may provide a specific technical effect, which will be described in detail below.

In some embodiments, the second humidity sensing layer 320 is entirely covered by the third humidity sensing layer 330 over the first interdigital structure 212 and the second interdigital structure 222. The material and the forming process of the third humidity sensing layer 330 are similar to those of the first humidity sensing layer 310 and are not repeated herein.

Reference is made to FIG. 5. FIG. 5 is a schematic top view of a humidity sensor 100 according to one embodiment of the present disclosure. The humidity sensor 100 includes a substrate 110, an electrode structure 200, and a humidity sensing structure 300. The electrode structure 200 is disposed on the substrate 110. In one embodiment, the electrode structure 200 comprises a first electrode layer 210 and a second electrode layer 220. The first electrode layer 210 has a first interdigital structure 212, and the second electrode layer 220 has a second interdigital structure 222. The humidity sensing structure 300 is disposed on the electrode structure 200. In one embodiment, the first interdigital structure 212 and the second interdigital structure 222 are covered by the humidity sensing structure 300.

Figure 6:
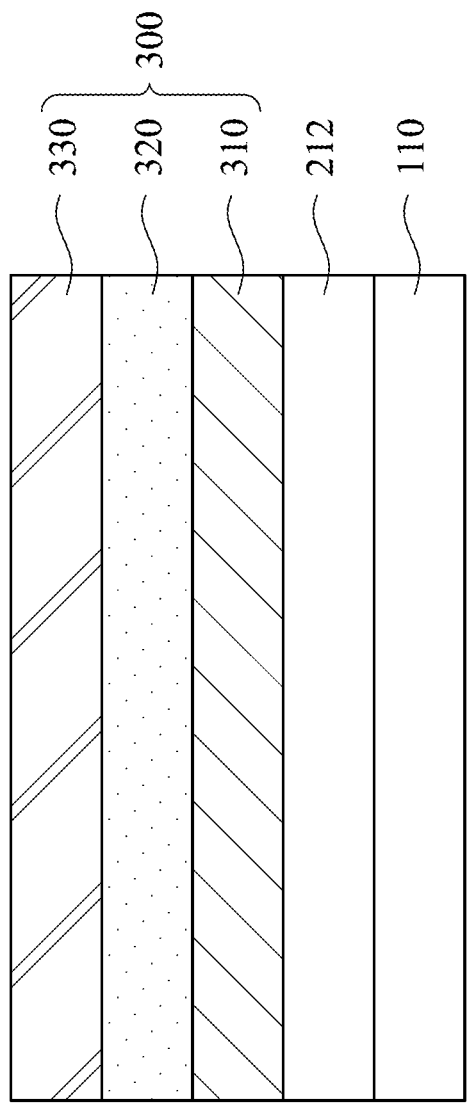
FIG. 6 is a schematic cross-sectional view taken along line A-A' in FIG. 5.
Figure 7:
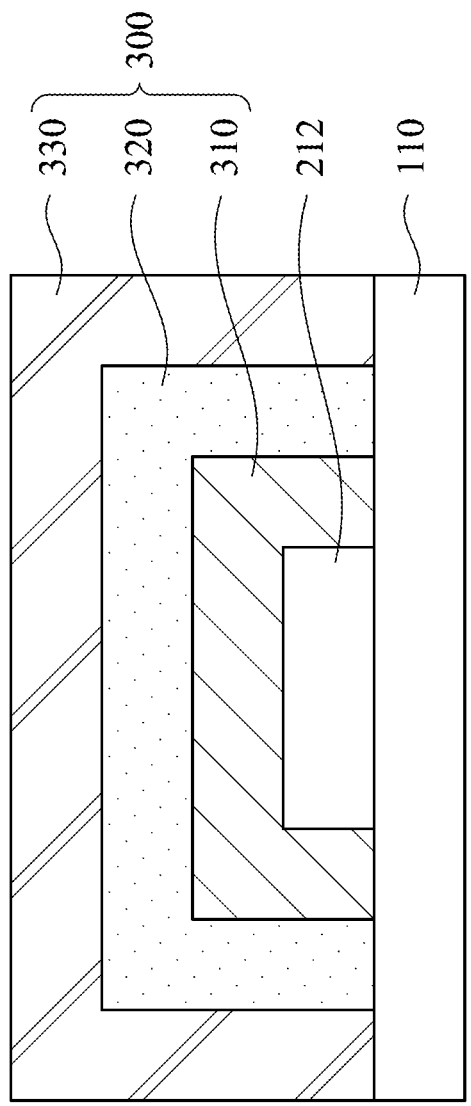
FIG. 7 is a schematic cross-sectional view taken along line B-B' in FIG. 5.

Reference is made to FIG. 6 and FIG. 7. FIG. 6 is a schematic cross-sectional view taken along line A-A' in FIG. 5. FIG. 7 is a schematic cross-sectional view taken along line B-B' in FIG. 5. In one embodiment, the humidity sensing structure 300 at least includes the first humidity sensing layer 310 and the second humidity sensing layer 320. The first humidity sensing layer 310 is in direct contact with the first interdigital structure 212 of the electrode structure 200 and has a first oxygen vacancy number. The second humidity sensing layer 320 is disposed on the first humidity sensing layer 310 and has a second oxygen vacancy number. In one embodiment, the first humidity sensing layer 310 and the second humidity sensing layer 320 comprises bismuth ferrite ($BiFeO_3$). It is noted that in the present disclosure, the second oxygen vacancy number of the second humidity sensing layer 320 is greater than the first oxygen vacancy number of the first humidity sensing layer 310. This arrangement may provide a specific technical effect. Specifically, the oxygen vacancy number of bismuth ferrite may affect the conductivity of bismuth ferrite. Therefore, the more the oxygen vacancy number of bismuth ferrite, the lower the conductivity of bismuth ferrite. Conversely, the less the oxygen vacancy number of bismuth ferrite, the higher the conductivity of bismuth ferrite.

The inventor designed the humidity sensor of the present disclosure based on the principle above. In detail, the inventor uses bismuth ferrite to absorb the external moisture, in which the oxygen vacancy in bismuth ferrite is combined with oxygen in the external moisture. In other words, the oxygen in the external moisture can fill into the oxygen vacancy in bismuth ferrite, resulting in variation of conductivity and impedance of bismuth ferrite. By measuring the variation in the impedance value across two ends of the humidity sensor 100 of the present disclosure, the humidity value of the external environment can be detected. In one or more embodiment, the humidity sensor of the present disclosure is capable of measuring relative humidity of 0-100%, preferably 10-98%, and more preferably 35-95%.

Furthermore, in the humidity sensor of the present disclosure high sensitivity can be achieved as the oxygen vacancy in bismuth ferrite is combined with the oxygen in the external moisture, allowing the humidity sensor to measure an impedance value variation of more than 4 orders of magnitude. The humidity sensor of the present disclosure has a promising application prospect as compared to a conventional humidity sensor, which can measure an impedance value variation of only 2 to 3 orders of magnitude.

It is understood that the humidity sensing structure 300 includes at least the first humidity sensing layer 310 and the second humidity sensing layer 320, but is not limited thereto. One of ordinary skill in the art can select the desired number of the humidity sensing layer in the humidity sensing structure 300 based on actual needs. Specifically, the humidity sensing structure 300 may include a plurality of humidity sensing layers sequentially disposed over the electrode structure 200, in which the humidity sensing layer that is closest to the electrode structure 200 has a lowest oxygen vacancy number, and other humidity sensing layers sequentially disposed over the electrode structure 200 has an increasing oxygen vacancy number.

Still referring to FIG. 6 and FIG. 7. In another embodiment, the humidity sensing structure 300 further includes a third humidity sensing layer 330. The third humidity sensing layer 330 is disposed on the second humidity sensing layer 320 and has a third oxygen vacancy number. It is noted that in the present disclosure, the third oxygen vacancy number of the third humidity sensing layer 330 is greater than the second oxygen vacancy number of the second humidity sensing layer 320.

In summary, the present disclosure provides a humidity sensor and a manufacturing method thereof. The method includes forming a humidity sensor by respectively forming at least two humidity sensing layers on an electrode structure at different sintering temperatures. The humidity sensor of the present disclosure is capable of measuring a wide range of relative humidity values and has a higher sensitivity, which is able to measure an impedance value variation of more than 4 orders of magnitude. Compared to the conventional humidity sensor, which can measure an impedance value variation of only 2 to 3 orders of magnitude, the humidity sensor of the present disclosure is eligible for accurate monitoring of the ambient humidity in a workshop during manufacturing processes. Moreover, since the humidity sensor of the present disclosure has a higher sensitivity, it can also play a role in the future application development of mobile communication devices and has a promising application prospect.

Although the present invention has been described in considerable detail with reference to certain embodiments thereof, the present invention is not limited thereto. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A humidity sensor, comprising:
   a substrate;
   an electrode structure disposed on the substrate; and
   a humidity sensing structure disposed on the electrode structure, wherein the humidity sensing structure comprises:
     a first humidity sensing layer directly contacting the electrode structure and having a first oxygen vacancy number; and
     a second humidity sensing layer disposed on the first humidity sensing layer and having a second oxygen vacancy number, wherein the second oxygen vacancy number is greater than the first oxygen vacancy number.

2. The humidity sensor of claim 1, wherein the humidity sensing structure further comprises a third humidity sensing layer disposed on the second humidity sensing layer, the third humidity sensing layer has a third oxygen vacancy number greater than the second oxygen vacancy number.

3. The humidity sensor of claim 1, wherein the first humidity sensing layer and the second humidity sensing layer each comprises a perovskite-type oxide material with an $ABO_3$ structure.

4. The humidity sensor of claim 1, wherein the electrode structure comprises an interdigital structure.

5. A method of manufacturing humidity sensor, comprising steps of:
providing a substrate and an electrode structure, wherein the electrode structure is located on the substrate; and
forming a humidity sensing structure on the electrode structure, comprising:
forming a first humidity sensing layer at a first sintering temperature, wherein the first humidity sensing layer is in direct contact with the electrode structure and has a first oxygen vacancy number; and
forming a second humidity sensing layer on the first humidity sensing layer at a second sintering temperature, wherein the second sintering temperature is lower than the first sintering temperature, such that a second oxygen vacancy number of the second humidity sensing layer is greater than the first oxygen vacancy number.

6. The method of claim 5, further comprising steps of:
forming a third humidity sensing layer on the second humidity sensing layer at a third sintering temperature, wherein the third sintering temperature is lower than the second sintering temperature, such that a third oxygen vacancy number of the third humidity sensing layer is greater than the second oxygen vacancy number.

7. The method of claim 5, wherein the first humidity sensing layer and the second humidity sensing layer each comprises a perovskite-type oxide material with an $ABO_3$ structure.

8. The method of claim 5, wherein the first sintering temperature ranges from 300° C. to 700° C.

9. The method of claim 5, wherein the second sintering temperature ranges from 200° C. to 600° C.

10. The method of claim 5, wherein the third sintering temperature ranges from 100° C. to 500° C.

* * * * *